US009318058B2

(12) United States Patent
Furukawa et al.

(10) Patent No.: US 9,318,058 B2
(45) Date of Patent: Apr. 19, 2016

(54) DISPLAY UNIT, DISPLAYING METHOD, AND RECORDING MEDIUM

(71) Applicant: Sony Corporation, Tokyo (JP)

(72) Inventors: Norimasa Furukawa, Tokyo (JP); Naoki Ikawa, Chiba (JP); Ichiro Murakami, Tokyo (JP); Kentaro Okuyama, Kanagawa (JP); Akira Ebisui, Kanagawa (JP)

(73) Assignee: Sony Corporation (JP)

(*) Notice: Subject to any disclaimer, the term of this patent is extended or adjusted under 35 U.S.C. 154(b) by 153 days.

(21) Appl. No.: 14/075,006

(22) Filed: Nov. 8, 2013

(65) Prior Publication Data

US 2014/0139461 A1 May 22, 2014

(30) Foreign Application Priority Data

Nov. 16, 2012 (JP) ................................ 2012-252652

(51) Int. Cl.

*G09G 5/10* (2006.01)
*G02F 1/133* (2006.01)
*G09G 3/34* (2006.01)

(52) U.S. Cl.

CPC .......... *G09G 3/342* (2013.01); *G09G 2310/024* (2013.01); *G09G 2320/0233* (2013.01); *G09G 2320/0257* (2013.01); *G09G 2320/0261* (2013.01); *G09G 2320/103* (2013.01)

(58) Field of Classification Search

CPC ... G06F 3/0488; G06F 3/04883; G06F 3/044; G06F 3/04886; G06F 3/045
USPC .......................................... 345/173, 102, 691
See application file for complete search history.

(56) References Cited

U.S. PATENT DOCUMENTS

2012/0069063 A1* 3/2012 Sato et al. .................... 345/690
2012/0127128 A1* 5/2012 Large et al. .................. 345/175
2013/0107164 A1* 5/2013 Verslegers et al. ............. 349/61
2013/0258711 A1 10/2013 Okuyama et al.

FOREIGN PATENT DOCUMENTS

JP 2012-141588 A 7/2012

* cited by examiner

*Primary Examiner* — Lixi C Simpson
*Assistant Examiner* — Ngan Pham Lu
(74) *Attorney, Agent, or Firm* — Lerner, David, Littenberg, Krumholz & Mentlik, LLP

(57) ABSTRACT

A display unit includes: an image display panel; a backlight section disposed on a back surface of the image display panel, and including a light guide member and a polymer dispersed liquid crystal panel; a light source emitting light, the light being allowed to enter the light guide member of the backlight section; a polymer dispersed liquid crystal panel drive section driving the polymer dispersed liquid crystal panel of the backlight section in synchronization with writing of an image displayed on the image display panel to control a location that scatters light incident on the light guide member on the polymer dispersed liquid crystal panel; and a light source drive section allowing the light source to blink in synchronization with a period in which light is scattered by the polymer dispersed liquid crystal panel.

10 Claims, 11 Drawing Sheets

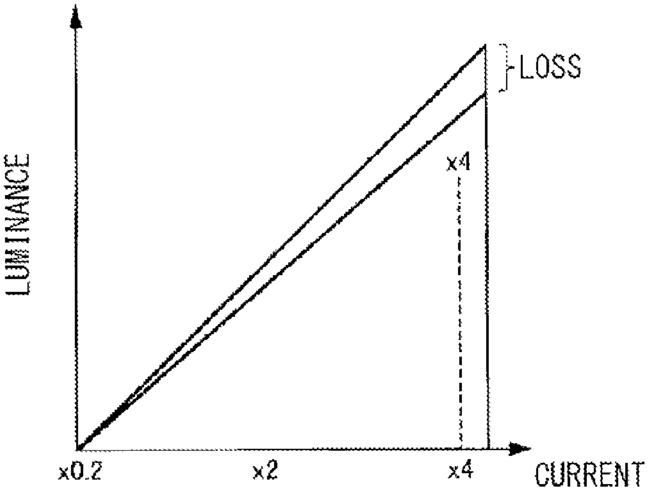
FIG. 9
FIG. 10A
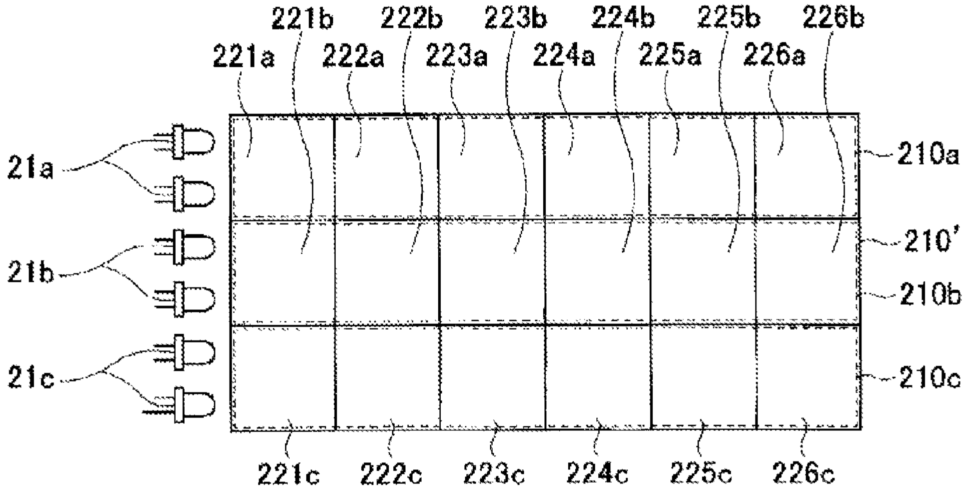
FIG. 10B
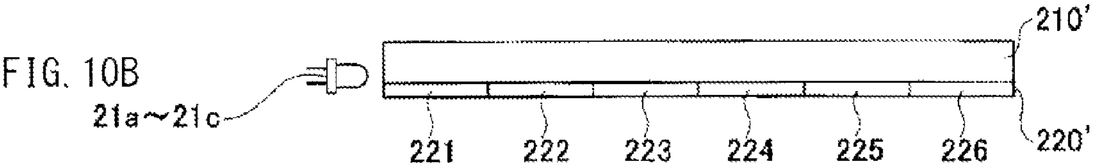

FIG. 12A
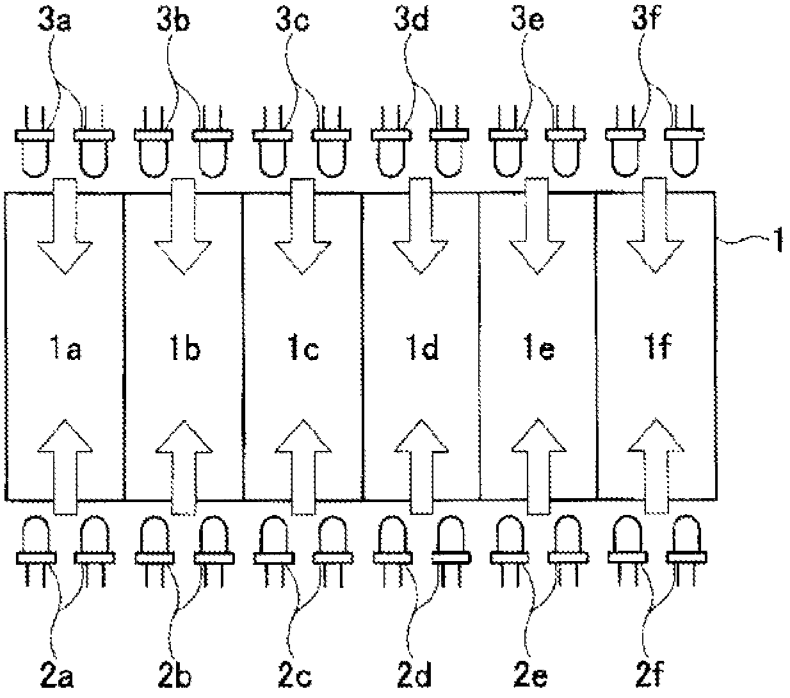
FIG. 12B
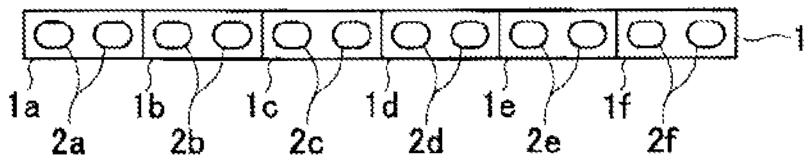
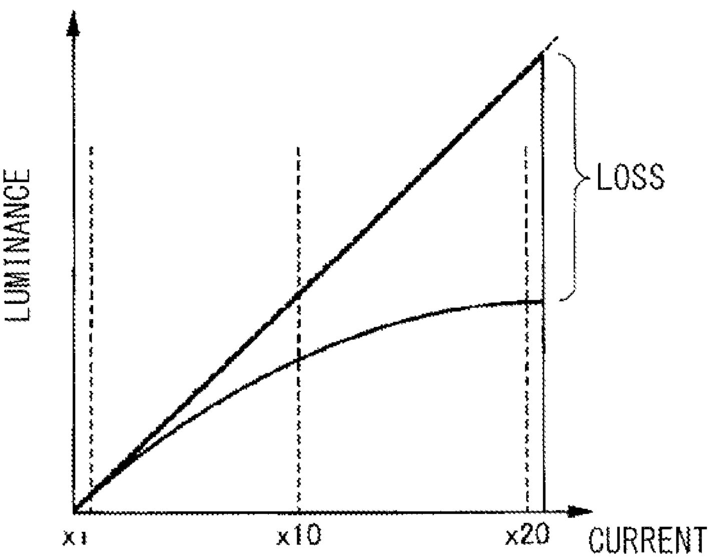
FIG. 13

DISPLAY UNIT, DISPLAYING METHOD, AND RECORDING MEDIUM

CROSS REFERENCE TO RELATED APPLICATIONS

This application claims the benefit of Japanese Priority Patent Application JP 2012-252652 filed Nov. 16, 2012, the entire contents of each which are incorporated herein by reference.

BACKGROUND

The present disclosure relates to a display unit and a displaying method that display an image or the like, and recording medium holding a program that executes the displaying method. More specifically the present disclosure relates to technology applied to a display unit including a backlight.

When a display unit such as a liquid crystal display panel displays an image of a rapidly moving object, so-called motion blur in which the image looks blurred may occur. For example, when the liquid crystal display panel displays an image of an object moving at high speed from the left to the right on a screen, for a person watching the image, a contour of the moving object appears blurred. The motion blur occurs in an image displaying method called "hold-type displaying".

In related art, as a technique of reducing motion blur in a display unit including a liquid crystal display panel, for example, it is known that a backlight illuminating a back surface of the liquid crystal display panel is turned on and off at high speed in conjunction with an image display period to shorten duration in which an image is displayed. In other words, motion blur that is an issue specific to the liquid crystal display panel is allowed to be reduced by adopting a displaying mode close to impulse-type displaying, as with a display unit using a CRT (Cathode Ray Tube) in related art.

FIGS. 12A and 12B illustrate an example of a configuration for performing on-off control of a backlight in related art. As illustrated in FIGS. 12A and 12B, the backlight is configured of a light guide plate 1 and light-emitting diodes 2*a* to 2*f* and 3*a* to 3*f* emitting light toward the light guide plate 1. FIG. 12A and FIG. 12B are a front view and a side view of the light guide plate 1, respectively.

As illustrated in FIG. 12A, the light guide plate 1 has six regions 1*a*, 1*b*, 1*c*, 1*d*, 1*e*, and 1*f*, and the light-emitting diodes 2*a* to 2*f* and the light-emitting diodes 3*a* to 3*f* are disposed on side surfaces of the regions 1*a* to 1*f*, respectively. For example, the light-emitting diodes 2*a* and 2*b* are disposed on one side surface and the other side surface of the region 1*a*, respectively. Such a backlight including light sources on side surfaces of the light guide plate is called an edge-light system.

Each of the regions 1*a*, 1*b*, 1*c*, 1*d*, 1*e*, and 1*f* is configured to emit light by light incident from the light-emitting diodes that are disposed on the side surfaces thereof, and not to propagate the light toward other regions. For example, the light-emitting diodes 2*a* and 3*a* emit light to allow the region 1*a* of the light guide plate 1 to emit light.

A liquid crystal display panel is disposed on a front surface of the backlight as illustrated in FIGS. 12A and 12B, and the six regions 1*a* to 1*f* of the light guide plate 1 are allowed to sequentially emit light for a short time. A process of allowing these six regions 1*a* to 1*f* to sequentially emit light is performed in one field period of an image displayed on the liquid crystal display panel, and light is sequentially emitted from the regions in order in which the image on the liquid crystal display panel is rewritten. When light emission of the backlight is controlled in such a manner, an image displayed on the liquid crystal display panel that is located on the front surface of the backlight is displayed on each of the regions for a short time. It is to be noted that a period in which the backlight is turned on and off is preferably too short for a person watching a displayed image to recognize blinking of the backlight.

When on-off control is performed on each of the regions of the backlight in such a manner, the display unit including the liquid crystal display panel is allowed to display an image with unnoticeable motion blur.

Incidentally, it has been proposed to use a polymer dispersed liquid crystal (PDLC) as the backlight disposed on the back surface of a liquid crystal display panel.

A light guide member for backlight in related art is formed by mixing a scattering material into a transparent resin material to form a mixture, and molding the mixture, and a surface of the backlight emits light with uniform luminance by a function of the scattering material. On the other hand, a surface of a backlight including the PDLC emits light by a scattering function of the PDLC. The PDLC is capable of controlling a light scattering state. In Japanese Unexamined Patent Application Publication No. 2012-141588, an example of a backlight using the PDLC is described.

SUMMARY

As a technique of preventing motion blur in an image displayed on the liquid crystal display panel, as described above, it is known that light sources included in the backlight are turned on and off at high speed in conjunction with an image display period. For example, in a case where light-emitting diodes are used as the light sources, a light-emitting diode drive section turns the light-emitting diodes on and off at high speed in conjunction with an image display period. However, as illustrated in FIGS. 12A and 12B, in a case where the light-emitting diode drive section drives the light-emitting diodes to sequentially emit light while switching from one of light emission regions of the backlight to another, light emission efficiency is reduced.

In other words, as illustrated in FIGS. 12A and 12B, in a case where the backlight is partitioned into six regions, and the six regions sequentially emit light, in order to obtain the same brightness as that in a case where the six regions simultaneously emit light, it is preferable for each of the light-emitting diodes to emit light with brightness six times higher than that in a case where each of the light-emitting diodes constantly emits light. When each of the light-emitting diodes emits light with six times higher brightness, a user watching an image displayed on the liquid crystal display panel perceives substantially the same brightness as that when all of the light-emitting diodes is constantly on.

To allow the light-emitting diodes to emit light with six times higher brightness, it is preferable to increase a current value supplied to the light-emitting diodes correspondingly. However, the light-emitting diodes have a characteristic in that loss caused by heat generation or the like is increased with an increase in current value. Therefore, to allow the light-emitting diodes to obtain six times higher brightness, it is preferable to flow a more than six times higher current through the light-emitting diodes, thereby causing an increase in power consumption of the backlight.

FIG. 13 is a diagram illustrating a relationship between a current flowing through a light-emitting diode (a horizontal axis) and light emission luminance (a vertical axis). As illustrated in FIG. 13, luminance is not increased linearly with an increase in the current, thereby causing an increase in loss. FIG. 13 illustrates cases where the current value is multiplied by 1, 10, and 20. As can be seen from FIG. 13, in the case where the current value is multiplied by 10 or 20, loss is extremely increased, compared to the case where the current value is multiplied by 1 (in a case where the light-emitting diode is constantly on).

Therefore, in an attempt to prevent motion blur only by controlling lighting periods of the light sources included in the backlight, power consumption of the backlight is increased.

It is desirable to efficiently reduce motion blur without increasing power consumption.

According to an embodiment of the present disclosure, there is provided a display unit including: an image display panel; a backlight section disposed on a back surface of the image display panel, and including a light guide member and a polymer dispersed liquid crystal panel; a light source emitting light, the light being allowed to enter the light guide member of the backlight section; a polymer dispersed liquid crystal panel drive section driving the polymer dispersed liquid crystal panel of the backlight section in synchronization with writing of an image displayed on the image display panel to control a location that scatters light incident on the light guide member on the polymer dispersed liquid crystal panel; and a light source drive section allowing the light source to blink in synchronization with a period in which light is scattered by the polymer dispersed liquid crystal panel.

According to an embodiment of the present disclosure, there is provided a displaying method including: driving a polymer dispersed liquid crystal panel included in a backlight section in synchronization with writing of an image displayed on an image display panel to control a location that scatters light incident on a light guide member included in the backlight section on the polymer dispersed liquid crystal panel, the backlight section being disposed on a back surface of the image display panel; and allowing a light source to blink in synchronization with a period in which light is scattered by the polymer dispersed liquid crystal panel, the light source allowing light to enter the light guide member.

According to an embodiment of the present disclosure, there is provided a recording medium having a computer-readable program embodied therein, the computer readable program causing, when executed by a machine, the machine to implement a method, the method including: driving a polymer dispersed liquid crystal panel included in a backlight section in synchronization with writing of an image displayed on an image display panel to control a location that scatters light incident on a light guide member included in the backlight section on the polymer dispersed liquid crystal panel, the backlight section being disposed on a back surface of the image display panel; and allowing a light source to blink in synchronization with a period in which light is scattered by the polymer dispersed liquid crystal panel, the light source allowing light to enter the light guide member.

In the embodiments of the present disclosure, a state in which the backlight section illuminates the back surface of the image display panel is determined by a combination of two kinds of control, that is, control of a region that scatters light of the polymer dispersed liquid crystal panel included in the backlight section and blinking of the light source. When the two kinds of control, that is, control of the region that scatters light of the polymer dispersed liquid crystal panel and blinking of the light source are appropriately performed in synchronization with writing of an image displayed on the image display panel, an image with less motion blur is allowed to be displayed favorably.

In the embodiments of the present disclosure, in the display unit, an illumination state by a backlight is controlled by two factors, i.e., the polymer dispersed liquid crystal panel and the light source. In this case, since the polymer dispersed liquid crystal panel is allowed to efficiently scatter light from the light source, light with appropriate brightness is applied to the back surface of the image display panel without increasing luminance of the light source. Therefore, the light source is allowed to be used efficiently, and a process of suppressing motion blur is efficiently performed.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the technology, and are incorporated in and constitute a part of this specification. The drawings illustrate embodiments and, together with the specification, serve to explain the principles of the technology.

FIG. 9 is a characteristic diagram illustrating a relationship between a drive current and luminance of a light-emitting diode in the embodiment of the present disclosure.

FIGS. 10A and 10B are a plan view and a side view illustrating a configuration of a backlight section according to another embodiment of the present disclosure, respectively.

FIGS. 12A and 12B are plan views illustrating a configuration example of a backlight section in related art.

FIG. 13 is a characteristic diagram illustrating an example of efficiency of a light-emitting diode when luminance thereof is controlled.

DETAILED DESCRIPTION

Some embodiments of the present disclosure will be described below in the following order.

1. Configuration example of display unit according to embodiment (FIGS. 1 and 2)
2. Characteristics of polymer dispersed liquid crystal panel (FIGS. 3A and 3B)
3. Process of controlling backlight section (FIGS. 4 and 5)
4. Example of control timing (FIG. 6)
5. Example of luminance control state (Example 1: FIG. 7)

Figure 8:
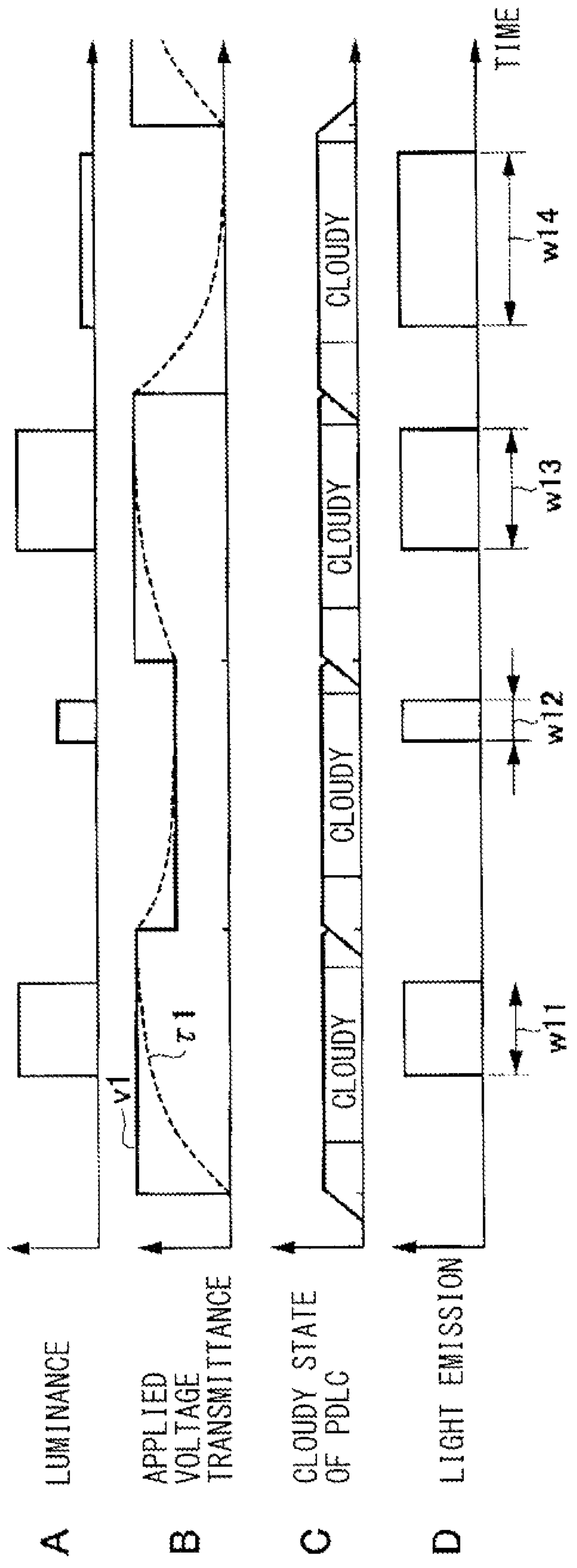
FIG. 8 is a timing chart illustrating an example (Example 2) of the luminance control state in the embodiment of the present disclosure.

6. Example of luminance control state (Example 2: FIG. 8)
7. Description of light emission efficiency (FIG. 9)
8. Another embodiment (FIGS. 10A, 10B, and 11)
9. Modifications (1. Configuration Example of Display Unit According to Embodiment)

Figure 1:
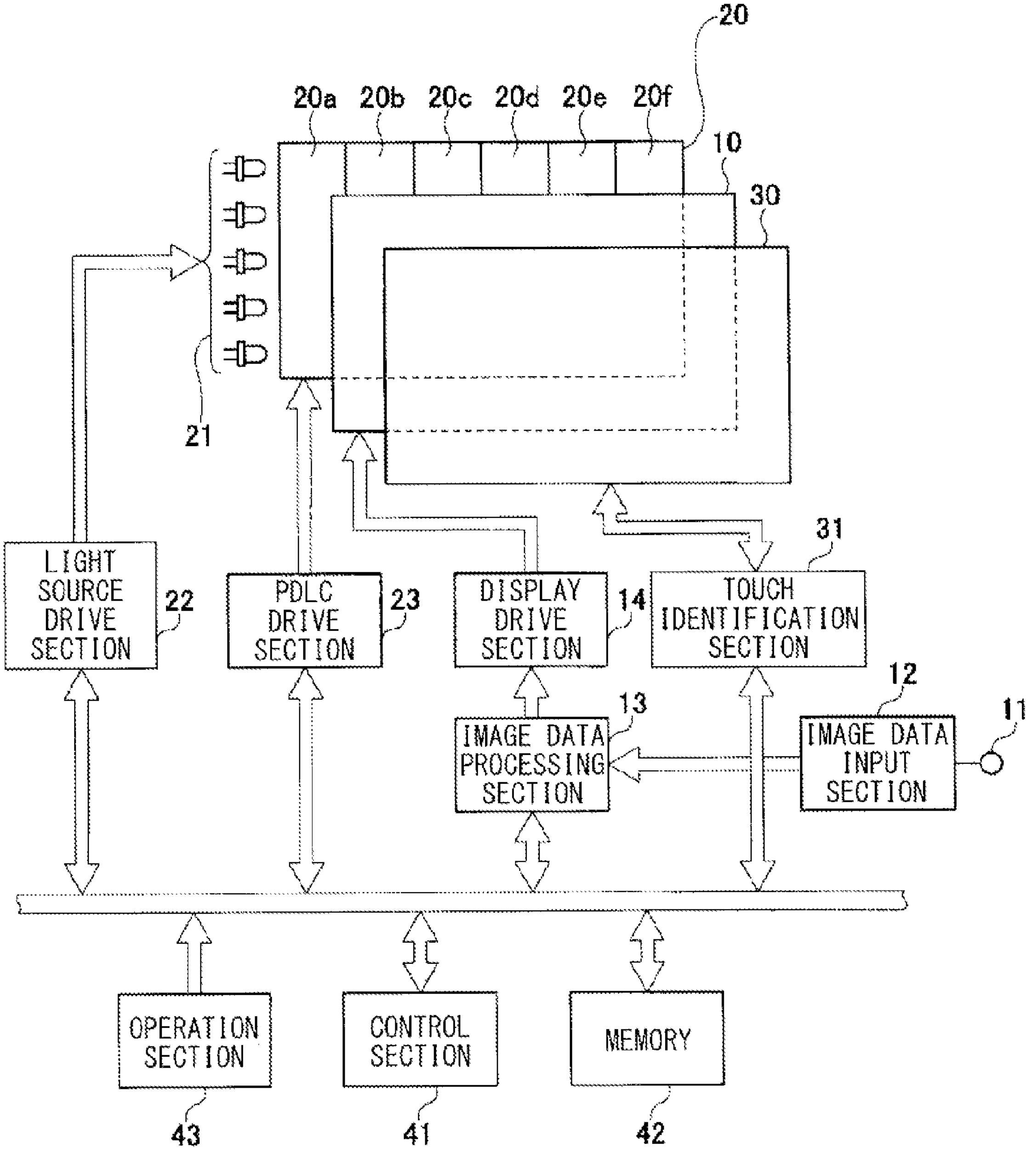
FIG. 1 is a block diagram illustrating a configuration of a display unit according to an embodiment of the present disclosure.

FIG. 1 is a diagram illustrating a configuration of a display unit according to an embodiment of the present disclosure.

In the display unit illustrated in FIG. 1, only a configuration relating to display is illustrated; however, the display unit may be configured as a display unit incorporated into any of various electronic apparatuses. For example, the display unit may be a display unit incorporated into an electronic apparatus having an information processing function, such as a smartphone and a tablet terminal.

As illustrated in FIG. 1, the display unit includes a liquid crystal display panel 10 displaying an image or the like. The display unit includes a backlight section 20 on a back surface of the liquid crystal display panel 10. The display unit includes a touch panel 30 on a front surface of the liquid crystal display panel 10. It is to be noted that the touch panel 30 may be configured to be integrated with the liquid crystal display panel 10.

The backlight section 20 is configured of a light guide member and a polymer dispersed liquid crystal panel (hereinafter referred to as “PDLC panel”), and includes light-emitting diodes 21 as light sources on a side surface thereof. A configuration of the backlight section 20 will be described later.

The liquid crystal display panel 10 performs display based on image data input to an image data input terminal 11, or displays an image indicated by a control section 41. The image data input to the image data input terminal 11 is supplied to an image data input section 12. The image data input section 12 converts a size (pixel number) and a frame frequency of image data into a size and a frame frequency that are to be displayed on the liquid crystal display panel 10, respectively. Then, the image data subjected to an input process in the image data input section 12 is supplied to an image data processing section 13. The image data processing section 13 converts the image data into image data corresponding to display characteristics in the liquid crystal display panel 10. Moreover, the image data processing section 13 performs processing or the like on a displayed image based on an instruction from the control section 41 of the display unit.

The image data processed by the image data processing section 13 is supplied to a display drive section 14. The display drive section 14 performs an image display drive in the liquid crystal display panel 10, based on the supplied image data. In the liquid crystal display panel 10, an image is rewritten every frame of the supplied image data.

The light-emitting diodes 21 disposed on the backlight section 20 emit light by control by a light source drive section 22. The light source drive section 22 may turn the light-emitting diodes 21 to a mode in which the light-emitting diodes 21 continuously light up or a mode in which the light-emitting diodes 21 blink in synchronization with a frame period of image data. The light source drive section 22 determines one of the light emission modes by an instruction from the control section 41 of the display unit.

In the PDLC panel 220 included in the backlight section 20, a light scattering state is controlled by a PDLC panel drive section 23. The PDLC panel drive section 23 determines a scattering state of the PDLC panel 220 by an instruction from the control section 41 of the display unit.

When the touch panel 30 detects a finger of a user, a pen, or the like in contact with (or in proximity to) a surface of the liquid crystal display panel 10, the touch panel 30 outputs touch detection data. The touch detection data output from the touch panel 30 is supplied to the touch identification section 31. The touch identification section 31 identifies a kind, an instructed direction, or the like of a touch operation from a change in a touched position indicated by the supplied touch detection data. Data of the touch operation identified by the touch identification section 31 is supplied to the control section 41. The control section 41 provides an instruction to the image data processing section 13, based on a touch operation state supplied thereto, and changes a displayed image.

The control section 41 reads a program stored in a memory 42, and controls image display on the liquid crystal display panel 10 or an illumination state in the backlight section 20. At this time, the control section 41 identifies a touch detection state in the touch panel 30 identified by the touch identification section 31 or an application that is executed to display an image at present. Then, when the control section 41 controls the illumination state in the backlight section 20, the control section 41 refers to the identified touch detection state or the identified kind of the image. A specific control state of the backlight section 20 by the control section 41 will be described in detail later.

Moreover, the display unit includes an operation section 43 configured of an operation key and the like, and information such as a key operation detected by the operation section 43 is supplied to the control section 41. The control section 41 performs selection of an operation mode or the like, based on information supplied from the operation section 43.

Figure 2:
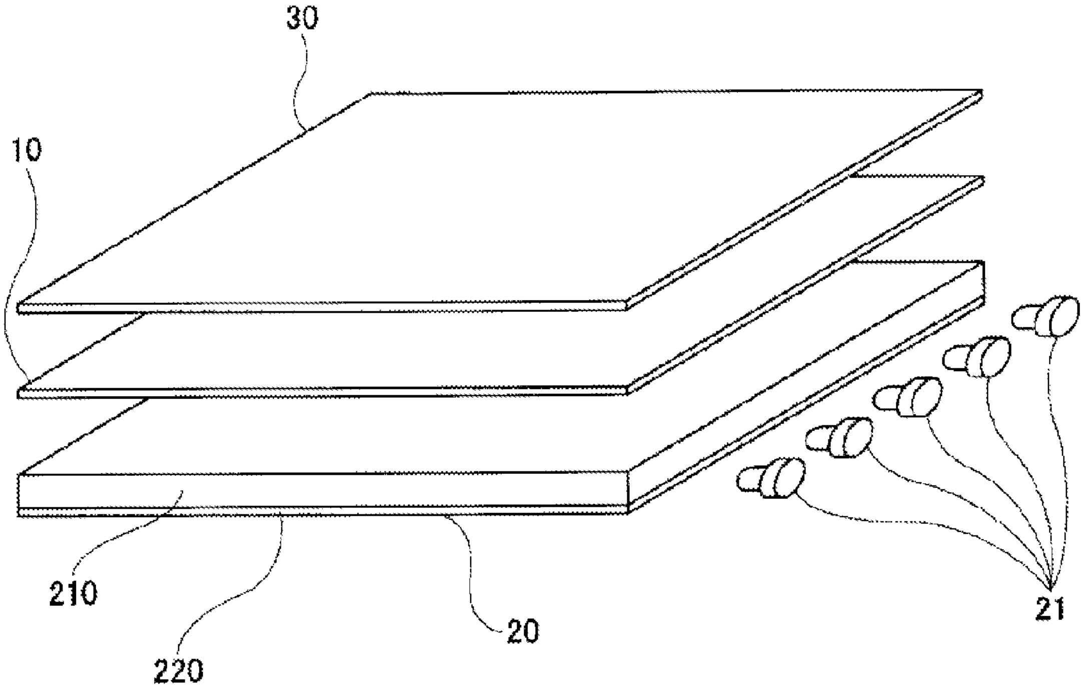
FIG. 2 is an exploded perspective view illustrating a configuration of a backlight section according to the embodiment of the present disclosure.

FIG. 2 is an exploded view of an example of an arrangement state of the liquid crystal display panel 10, the backlight section 20, and the touch panel 30.

As illustrated in FIG. 2, the backlight section 20 is disposed on the back surface (a bottom side in FIG. 2) of the liquid crystal display panel 10. The touch panel 30 is disposed on the front surface (a top side in FIG. 2) of the liquid crystal display panel 10. The touch panel 30 may be integrated with the liquid crystal display panel 10.

The backlight section 20 includes a light guide member 210 configured of a transparent resin plate, and a PDLC panel 220 bonded to the light guide member 210. A predetermined number of light-emitting diodes 21 as light sources are disposed on one or more side surfaces of the light guide member 210. As the light-emitting diodes 21, for example, light-emitting diodes emitting white are used. FIG. 2 illustrates an example in which five light-emitting diodes 21 are disposed on one side surface of the light guide member 210. When the light-emitting diodes emit light, light from the light-emitting diodes 21 enters the light guide member 210.

The PDLC panel 220 is a panel allowed to control a light scattering state with use of a polymer dispersed liquid crystal, and the PDLC panel drive section 23 (refer to FIG. 1) determines a scattering state of the PDLC panel 220. In this case, the PDLC panel 220 is partitioned into a plurality of regions, and the PDLC panel drive section 23 turns each of the regions to one of a state in which light is scattered (a cloudy state) and a transparent state in which light is not scattered.

When the PDLC panel 220 is in the state in which light is scattered, light having entered the light guide member 210 is scattered by the PDLC panel 220 to enter the back surface of the liquid crystal display panel 10. Since the light-emitting diodes 21 emit white light, the PDLC panel 220 emits white light in the state in which light is scattered.

When the PDLC panel 220 is in the state in which light is not scattered, light having entered the transparent light guide member 210 does not enter the liquid crystal display panel 10.

It is to be noted that, in the example in FIG. 2, the PDLC panel 220 is disposed on a bottom side of the light guide member 210; however, the PDLC panel 220 may be disposed on a top side (a side where the liquid crystal display panel 110 is disposed) of the light guide member 210.

(2. Characteristics of Polymer Dispersed Liquid Crystal Panel)

Next, a partition state and light scattering characteristics of the PDLC panel 220 will be described below referring to FIGS. 3A and 3B.

Figure 3A:
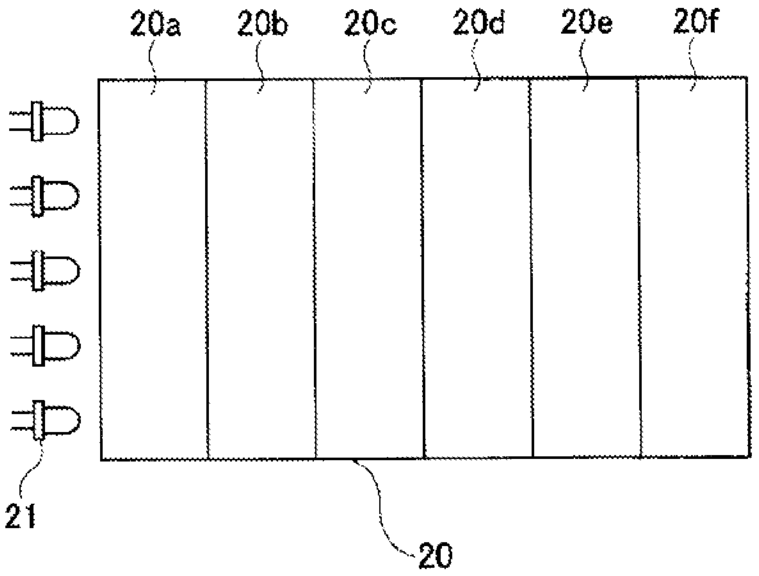
FIGS. 3A and 3B are diagrams illustrating a state in which the backlight section is partitioned into regions and scattering states of the regions in the embodiment of the present disclosure.

FIG. 3A is a diagram illustrating a state in which the PDLC panel 220 is partitioned into a plurality of regions. FIG. 3B is a diagram illustrating an example of scattering states in the plurality of regions. A horizontal axis indicates a light emission range, and a vertical axis indicates luminance.

As illustrated in FIG. 3A, the PDLC panel 220 is partitioned into six regions 20*a*, 20*b*, 20*c*, 20*d*, 20*e*, and 20*f*. In this example, the sizes of the regions 20*a* to 20*f* are equal to one another. The light-emitting diodes 21 may be disposed on, for example, a side surface adjacent to the region 20*a*. The position where the light-emitting diodes 21 are disposed are only one example, and the light-emitting diodes 21 may be disposed on any other position.

Moreover, the six regions 20*a* to 20*f* are set corresponding to a state in which an image is written to the liquid crystal display panel 10 disposed over the backlight section 20. In other words, when an image is written to a large number of pixels arranged in the liquid crystal display panel 10 from one horizontal line to another, each of the regions 20*a* to 20*f* is a region corresponding to a predetermined number of horizontal lines.

Figure 3B:
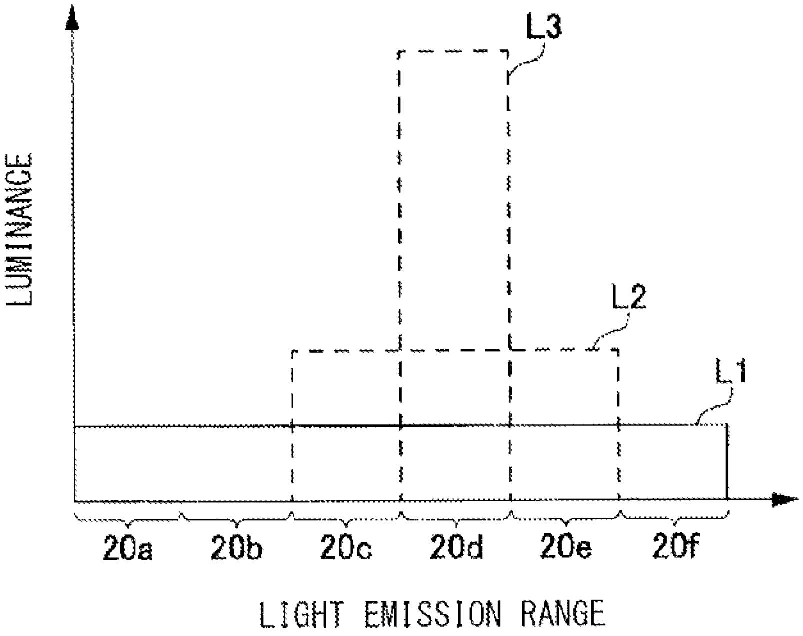

For example, when all of the regions 20*a* and 20*f* of the PDLC panel 220 scatter light in the partition state illustrated in FIG. 3A, all of the regions 20*a* to 20*f* in the backlight section 20 emit light with luminance L1, as illustrated in FIG. 3B. Therefore, at this time, the backlight section 20 illuminates the entire back surface of the liquid crystal display panel 10 with the luminance L1. The luminance L1 is determined by light emission luminance of the light-emitting diodes 21.

When only three regions 20*c*, 20*d*, and 20*e* of the PDLC panel 220 scatter light, as illustrated in FIG. 3B, the backlight section 20 emit light, from the three regions 20*c* to 20*e*, with luminance L2 about twice as high as the luminance L1.

Moreover, when only one region 20*d* of the PDLC panel 220 scatters light, as illustrated in FIG. 3B, the backlight section 20 emits light, from the one region 20*d*, with luminance L3 about six times as high as the luminance L1. It is to be noted that, in any of the cases of the luminance L1, L2, and L3, the light emission luminance of the light-emitting diodes 21 is the same. A state in which a region or regions are selected to scatter light as illustrated in FIG. 3B is only one example, and as long as an area in which light is scattered is the same, the light emission luminance is the same even in a case where a region or regions other than the region or the regions selected in the example in FIG. 3B scatter light.

Thus, light emission luminance of the backlight section 20 changes in relation to a change in an area of a region scattering light in the PDLC panel 220. However, a luminance change example illustrated in FIGS. 3A and 3B is an ideal state, and an actual luminance value may be slightly lower than a luminance value in relation to the area, such as a twice or six times higher luminance value.

The light scattering states of the respective regions 20*a* to 20*f* of the PDLC panel 220 are determined by the PDLC panel drive section 23. The scattering states of the regions 20*a* to 20*f* of the PDLC panel 220 are determined by the PDLC panel drive section 23, based on an instruction from the control section 41.

(3. Process of Controlling Backlight Section)

Figure 4:
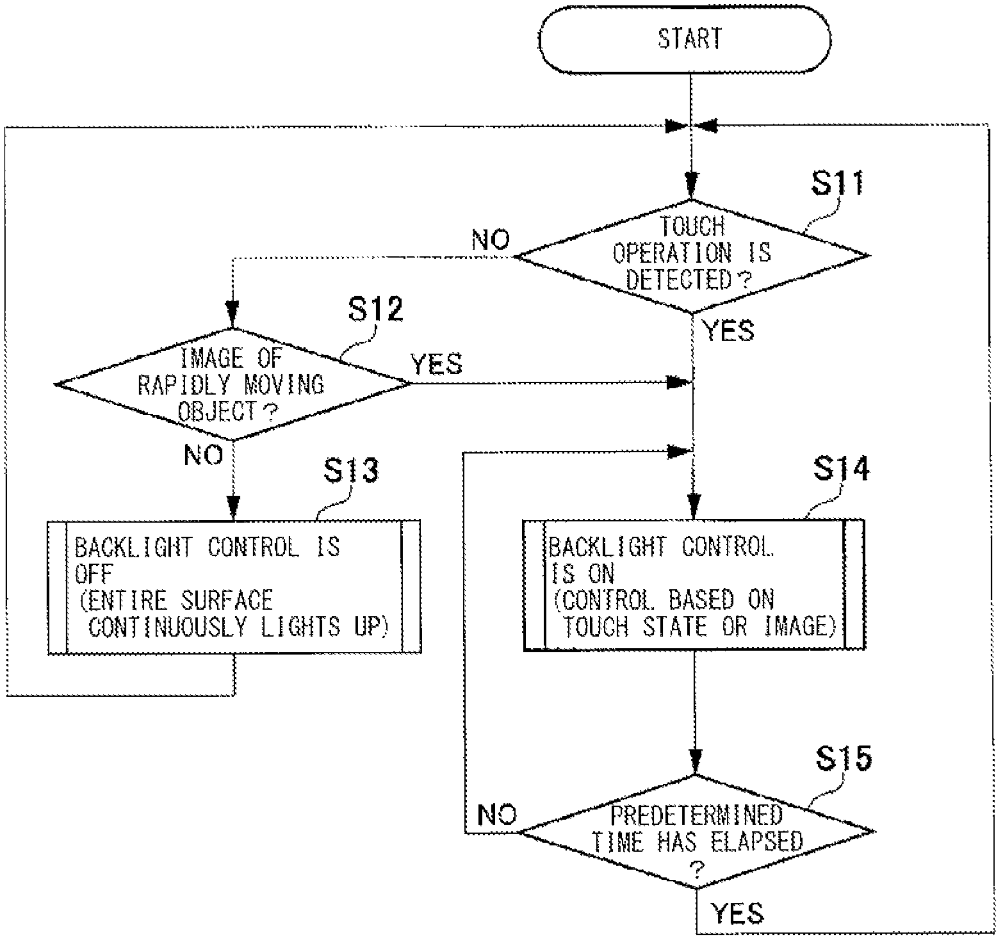
FIG. 4 is a flow chart illustrating a state of controlling the backlight section in the embodiment of the present disclosure.
Figure 5:
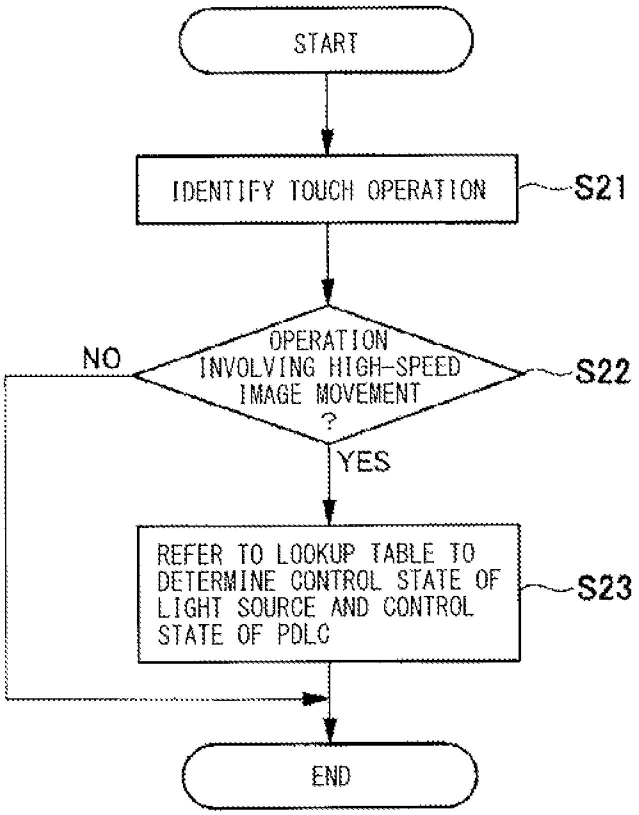
FIG. 5 is a flow chart illustrating a controlling state by identification of a touch operation in the embodiment of the present disclosure.

Flow charts in FIGS. 4 and 5 illustrate an example of a process of controlling light emission of the backlight section 20 by the control section 41 while the liquid crystal display panel 10 displays an image.

First, as illustrated in the flow chart in FIG. 4, the control section 41 determines whether or not a touch on the touch panel 30 is detected (step S11). When the control section 41 determines that no touch operation is performed, the control section 41 determines whether or not there is a possibility that an image displayed at present is an image of a rapidly moving object (step S12). Examples of a case where there is a possibility that the image displayed at present is an image of a rapidly moving object, as referred to in the step S12, include a case where the kind of the image displayed at present is any of various moving image contents. On the other hand, in a case where the kind of the image displayed at present is a still image, a text input screen, or the like, the control section 41 determines that there is no possibility that the image displayed at present is an image of a rapidly moving object.

In a case where the control section 41 determines that there is no possibility that the image displayed at present is an image of a rapidly moving object in step S12, the control section 41 does not control the backlight section 20 (step S13). In a state in which the control section 41 does not control the backlight section 20, the entire PDLC panel 220 scatters light, and the respective light-emitting diodes 21 constantly and continuously light up. In such a case, the backlight section 20 continuously emit light with uniform luminance over all of the regions 20*a* to 20*f*.

After the backlight section 20 continuously lights up in step S13, the process returns to determination in the step S11.

In a case where the control section 41 detects a touch operation in the step S11 and in a case where the control section 41 determines that there is a possibility that the image displayed at present is an image of a rapidly moving object in the step S12, the control section 41 controls the backlight section 20 (step S14). At this time, the control section 41 determines a lighting control state of the backlight section 20, based on the touch operation state of the touch panel 30 or the kind of the image detected in the step S11. An example of a specific process of determining the lighting control state by the control section 41 will be described later. The control section 41 sends an instruction to the light source drive section 22 and the PDLC panel drive section 23, based on the lighting control state determined by the control section 41.

After the lighting control state of the backlight section 20 is determined in the step S14, the control section 41 determines whether or not a predetermined time has elapsed since determination of the lighting control state (step S15), and lighting control in the step S14 is continued until a lapse of the predetermined time.

Then, when the control section 41 determines that the predetermined time has elapsed in the step S15, the process by the control section 41 returns to determination in the step S11.

The flow chart in FIG. 5 illustrates an example of control based on a touch operation when the control section 41 controls the backlight section 20.

First, the control section 41 obtains information of the kind of the touch operation identified by the touch identification section 31 (step S21). Then, the control section determines whether or not the touch operation is a touch operation with high-speed image movement (step S22). Examples of the touch operation with high-speed image movement include a flick and a pinch. The flick is an operation to scroll an image toward a direction where a finger touches a screen and moves quickly. The pinch is an operation in which two fingers touch the screen, and when a space between the touched fingers is narrowed, the screen is downsized, and when the space between the touched fingers is increased, the screen is upsized. These operations are operations in which an image is moved at relatively high speed.

Then, when it is determined that the touch operation is a touch operation involving high-speed image movement, the control section 41 refers to a prepared lookup table determining a control state to determine a drive state of the PDLC panel 220 and the lighting control state of the light-emitting diodes 21 (step S23). For example, data of the lookup table is stored in the memory 42.

For example, in a case where image movement based on the touch operation is fast, each lighting time duration of the light-emitting diodes 21 is shortened to shorten on-duty in which light emission is turned on. Accordingly, display giving high priority to suppressing the occurrence of motion blur is performed. However, luminance of the backlight section 20, that is, luminance of a displayed image is reduced corresponding to short on-duty in which light emission is turned on. It is to be noted that, in this state, when the light source drive section 22 increases a current supplied to the light-emitting diodes 21 to increase light emission luminance, reduction in luminance of the backlight section 20 is allowed to be prevented to some extent.

Moreover, for example, in a case where image movement based on the touch operation is not so fast, each lighting time duration of the light-emitting diodes 21 is relatively increased, based on the data of the lookup table to increase on-duty in which light emission is turned on. Accordingly, display giving high priority to brightness of the image is performed.

Further, when the control section 41 determines that the touch operation is not a touch operation involving image movement at high speed equal to or higher than a threshold value in the step S22, the control section 41 does not control the backlight section 20. In a state in which the control section 41 does not control the backlight section 20, the same control as that in the step S13 is performed. In other words, the entire PDLC panel 220 scatters light, and the respective light-emitting diodes 21 constantly and continuously light up.

The flow chart in FIG. 5 illustrates a process in the step S14 of the flow chart in FIG. 4 in the control section 41 in a case where the touch operation is detected in the step S11 of the flow chart in FIG. 4. On the other hand, in a case where a possibility that the image is an image of a rapidly moving object is detected in the step S12 in the flow chart in FIG. 4, the control section 41 is turned to a state in which the control section 41 controls the backlight section 20 in the step S23. Alternatively, in the case where a possibility that the image is an image of a rapidly moving object is detected, the control section 41 may determine a state of a displayed image actually used by the image data processing section 13 or the like to determine whether or not to control the backlight section 20 in the step S23.

(4. Example of Control Timing)

Figure 6:
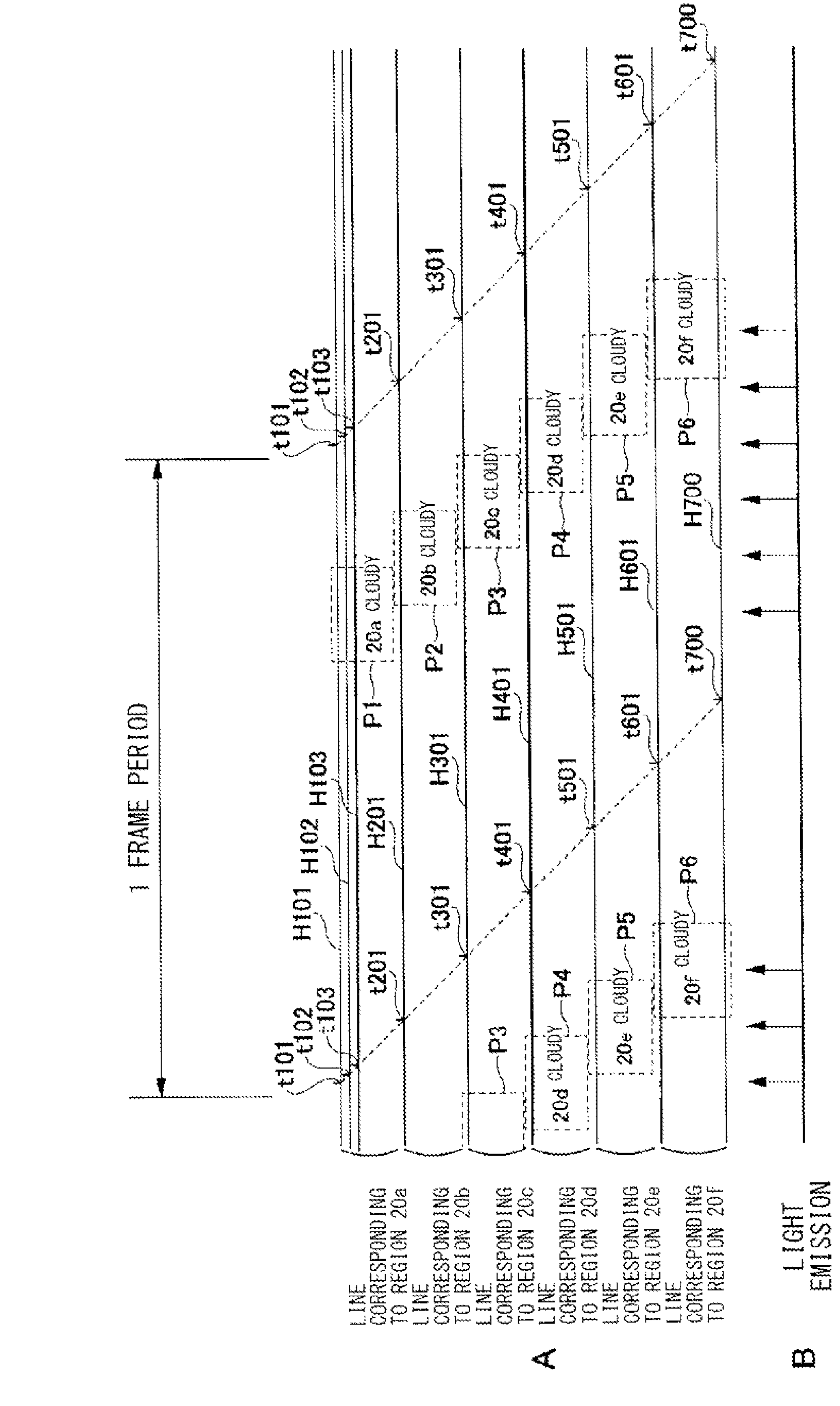
FIG. 6 is a timing chart illustrating control timing of the backlight section in the embodiment of the present disclosure.
Figure 7:
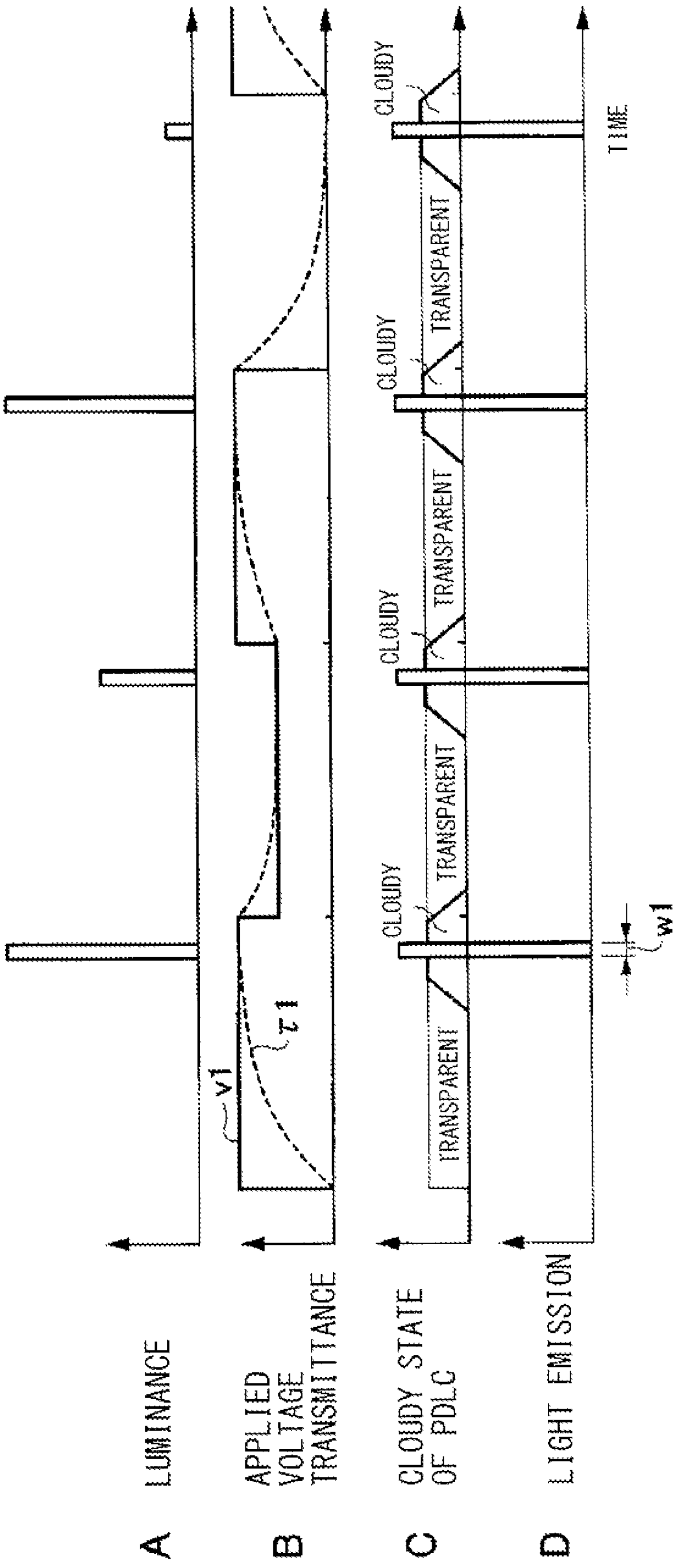
FIG. 7 is a timing chart illustrating an example (Example 1) of a luminance control state in the embodiment of the present disclosure.

FIG. 6 is a timing chart illustrating an example of a state in which the control section 41 controls the PDLC panel 220 and the light-emitting diodes 21.

In this case, for example, the liquid crystal display panel 10 has 600 lines H101 to H700. A hundred lines correspond to one region of the PDLC panel 220, and the region corresponding to the lines emits light to illuminate the lines. A relationship between the lines and the regions 20*a* to 20*f* of the PDLC panel 220 is as follows.

The region 20*a* of the PDLC panel 220 illuminates lines H101 to H200.

The region 20*b* of the PDLC panel 220 illuminates lines H201 to H300.

The region 20*c* of the PDLC panel 220 illuminates lines H301 to H400.

The region 20*d* of the PDLC panel 220 illuminates lines H401 to H500.

The region 20*e* of the PDLC panel 220 illuminates lines H501 to H600.

The region 20*f* of the PDLC panel 220 illuminates lines H601 to H700.

A part A in FIG. 6 illustrates timing when writing of image data to each of the lines H101 to H700 starts and timing when each of the regions 20*a* to 20*f* is turned to a cloudy state (a scattering state), and a part B in FIG. 6 illustrates timing when the light-emitting diodes 21 emit light.

As illustrated in the part A in FIG. 6, writing of image data to the line H101 starts at a timing t101 in each frame period. Writing of image data to the line H102 starts at a timing t102 slightly behind the timing t101. The timing of writing is shifted from one line to another in a similar manner, and writing of image data to the line H700 starts at a timing t700.

Then, when writing of an image to respective lines starts, and transmittance of pixels by the written image data (voltage) is stabilized, the PDLC drive section 23 turns each region as a unit to a cloudy state. For example, the PDLC drive section 23 turns the region 20*a* corresponding to the lines H101 to H200 to the cloudy state in a period P1 after a lapse of a certain time since a timing when writing to the respective lines H101 to H200 starts.

The PDLC drive section 23 also turns the region 20*b* corresponding to the lines H201 to H300 to the cloudy state in a period P2 after a lapse of a certain time since a timing when writing to the lines H201 to H300 starts.

The PDLC drive section 23 turns the regions 20*c*, 20*d*, 20*e*, and 20*f* to the cloudy state in periods P3, P4, P5, and P6 that are shifted by a predetermined period, respectively, in a similar manner.

Then, the light source drive section 22 allows the light-emitting diodes 21 to emit light in a period in which each of six regions 20*a* to 20*f* of the PDLC panel 220 is in the cloudy state. For example, in the period P1 in which only the region 20*a* is in the cloudy state, the light-emitting diodes 21 emit light once. Moreover, in the period P2 in which only the region 20*b* is in the cloudy state, the light-emitting diodes 21 emit light once. Thus, the light-emitting diodes 21 emit light six times in one frame period.

An example of more specific timings of an image data writing state in each line, a cloudy state of the PDLC panel 220, and light emission timing of the light-emitting diodes 21 will be described later (referring to FIGS. 7 and 8).

It is to be noted that, when the respective light-emitting diodes 21 emit light, for example, an equal drive current is used to allow the light-emitting diodes 21 to emit light with equal luminance. Alternatively, the light source drive section 22 may control light emission luminance at each light emission, based on an image state.

When control is performed as illustrated in FIG. 6, the backlight section 20 emits light from each of the regions 20*a* to 20*f* only while a period in which each of the regions 20*a* to 20*f* scatters light and a period in which the light-emitting diodes 21 emit light coincide with each other. When each of the regions 20*a* to 20*f* emits light for a short time in one frame period in such a manner, motion blur in an image displayed on the liquid crystal display panel 10 is allowed to be suppressed.

As described above referring to FIG. 3, the PDLC panel 220 has a characteristic in which light emission luminance is increased with a reduction in the area of a region scattering light. Therefore, when light emission luminance of the light-emitting diodes 21 is equal to that when the light-emitting diodes 21 continuously light up or is increased corresponding to a ratio between a lighting period and a non-lighting period, average light emission luminance of the backlight section 20 is allowed to be substantially equal to that when the entire backlight section 20 continuously lights up. Therefore, the light-emitting diodes 21 as the light sources are allowed to be used within a range in which light emission efficiency is high, and have an effect of efficiently suppressing motion blur with low power consumption.

In this embodiment, the control section 41 performs corresponding control only in a case where there is a possibility that an image is moved at high speed by a touch operation or in a case where there is a possibility that a displayed image is an image of a rapidly moving object; therefore, more efficient display control is allowed to be performed. In other words, the control section 41 controls the PDLC panel 220 and the light-emitting diodes 21 only when an image which may cause noticeable motion blur is displayed; therefore, an appropriate display mode is adopted.

(5. Example of Luminance Control State (Example 1))

FIG. 7 is a timing chart illustrating an example (Example 1) of a state in which the control section 41 controls the PDLC panel 220 and the light-emitting diodes 21 in synchronization with writing of image data to the liquid crystal display panel 10.

A part A in FIG. 7 illustrates change in luminance of a pixel located at a specific position in an image displayed on the liquid crystal display panel 10.

A part B in FIG. 7 illustrates change in a voltage V1 applied to write image data to the liquid crystal display panel and change in transmittance τ1 of light through the liquid crystal display panel 10. As illustrated in the part B in FIG. 7, although the transmittance τ1 changes with change in the voltage V1 applied to the liquid crystal display panel 10, change in the transmittance τ1 is delayed to some extent.

A part C in FIG. 7 illustrates whether the PDLC panel 220 is in a cloudy state or a transparent state. As illustrated in the part C in FIG. 7, the PDLC panel 220 is turned to the cloudy state at a timing when the transmittance τ1 illustrated in the part B in FIG. 7 is varied in response to writing of image data, and then is stabilized.

A part D in FIG. 7 illustrates a period in which the light-emitting diodes 21 light up. In the example in FIG. 7, luminance when the light-emitting diodes 21 light up is equal at any timing, and each light emission period w1 is also equal at any timing. As illustrated in the part D in FIG. 7, the light source drive section 22 allows the light-emitting diodes 21 to light up at substantially a midpoint of a period in which the PDLC panel 220 is in the cloudy state.

As illustrated in FIG. 7, when the control section 41 controls the cloudy state of the PDLC panel 220 and lighting of the light-emitting diodes 21 in synchronization with writing of image data to the liquid crystal display panel 10, display luminance of the liquid crystal display panel 10 is appropriately controllable, as illustrated in the part A in FIG. 7.

(6. Example of Luminance Control State (Example 2))

FIG. 8 is a timing chart illustrating an example (Example 2) of a state in which the control section 41 controls the PDLC panel 220 and the light-emitting diodes 21 in synchronization with writing of image data to the liquid crystal display panel 10. The example in FIG. 8 is an example in which a light emission period of the light-emitting diodes 21 is changed.

A part A in FIG. 8 illustrates change in luminance of a pixel located at a specific position in an image displayed on the liquid crystal display panel 10.

A part B in FIG. 8 illustrates change in the voltage V1 applied to write image data to the liquid crystal display panel 10 and change in transmittance τ1 of light through the liquid crystal display panel 10. The voltage V1 and the transmittance τ1 illustrated in the part B in FIG. 8 are the same as the voltage V1 and the transmittance τ1 illustrated in the part B in FIG. 7.

A part C in FIG. 8 illustrates whether the PDLC panel 220 is in the cloudy state or the transparent state. A part D in FIG. 8 illustrates a period in which the light-emitting diodes 21 light up. In the example in FIG. 8, while luminance when the light-emitting diodes 21 light up is equal at any timing, respective light emission periods w11, w12, w13, w14, . . . are different at respective light emission timings.

As illustrated in FIG. 8, when the control section 41 controls the light emission period of the light-emitting diodes 21, as illustrated in the part A in FIG. 8, luminance of the entire backlight section 20 is allowed to be changed more greatly than in the example in FIG. 7.

(7. Description of Light Emission Efficiency)

FIG. 9 is a characteristic diagram illustrating variations in light emission efficiency in this embodiment.

In this embodiment, the control section 41 controls luminance of the backlight section 20 by control of the PDLC panel 220, and control of light emission luminance of the light-emitting diodes 21 within a relatively narrow range. Therefore, loss caused by an increase in luminance is increased substantially linearly, and even though luminance is high, the loss is allowed to be suppressed relatively low, and large loss at the time of high light emission luminance in related art as illustrated in FIG. 13 is not caused. Accordingly, an effect of efficiently controlling light emission luminance of a backlight with low power consumption is obtained. Since low power consumption is achieved in such a manner, the display unit according to this embodiment of the present disclosure is suitable for battery-driven mobile apparatuses.

(8. Example of Another Embodiment)

Figure 11:
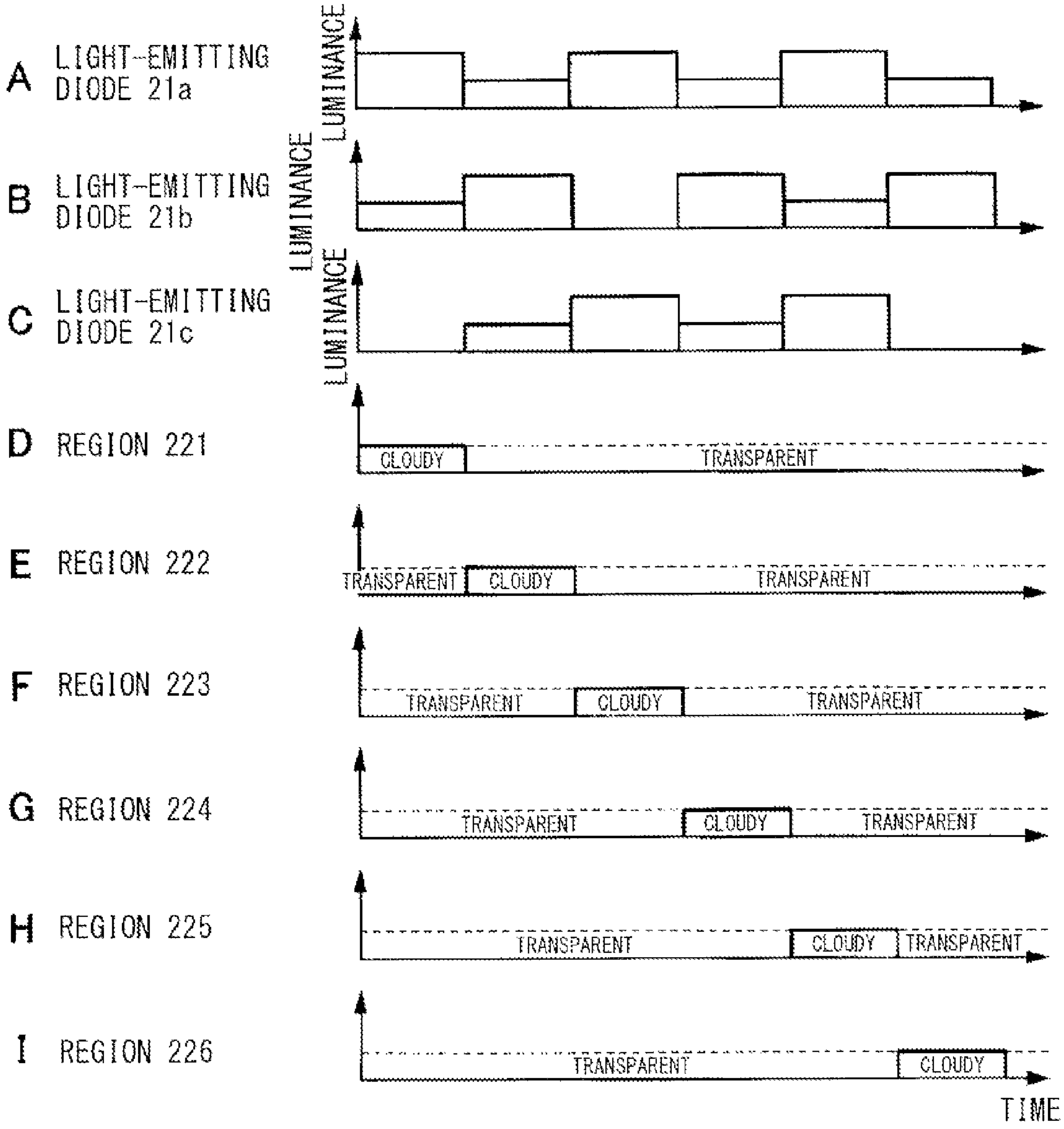
FIG. 11 is a timing chart illustrating an example of driving light-emitting diodes and a PDLC in FIGS. 10A and 10B.

FIGS. 10A, 10B, and 11 are diagrams illustrating a configuration of a backlight section according to another embodiment of the present disclosure.

FIGS. 10A and 10B illustrate the configuration of the backlight section. FIG. 10A is a top view, and FIG. 10B is a side view. As illustrated in FIGS. 10A and 10B, a light guide member 210' included in the backlight section is partitioned into three regions 210*a*, 210*b*, and 210*c*. Light-emitting diodes 21*a*, 21*b*, and 21*c* are disposed for the regions 210*a*, 210*b*, and 210*c*, respectively. For example, when the light-emitting diode 21*a* emits light, the light enters the region 210*a* of the light guide member 210'.

Then, a PDLC panel 220' is partitioned into six regions 221, 222, 223, 224, 225, and 226 along a direction orthogonal to a direction in which the light guide member 210' is partitioned, and light scattering states of the respective regions 221 to 226 are individually controllable.

Since the configuration illustrated in FIGS. 10A and 10B is adopted, as illustrated in FIG. 10A, luminance of eighteen regions 221*a* to 226*a*, 221*b* to 226*b*, and 221*c* to 226*c* in the backlight section are individually controllable. The eighteen regions 221*a* to 226*a*, 221*b* to 226*b*, and 221*c* to 226*c* are regions formed by partitioning the light guide member 210' into three regions and partitioning the PDLC panel 220' into six regions.

FIG. 11 is a timing chart illustrating an example of luminance of each of the light-emitting diodes 21*a* to 21*c* and change in scattering states of the six regions 221 to 226 of the PDLC panel 220' with time.

Parts A to C in FIG. 11 illustrate an example of luminance of the light-emitting diodes 21*a* to 21*c*, respectively. Parts D to I in FIG. 11 illustrate an example of scattering states of the six regions 221 to 226 of the PDLC panel 220', respectively.

For example, at a first timing illustrated in FIG. 11, the region 221 scatters light, the light-emitting diode 21*a* strongly emits light, the light-emitting diode 21*b* weakly emits light, and the light-emitting diode 21*c* is turned off. At this time, the region 221*a* illustrated in the part A in FIG. 10 emits light with high luminance, the region 221*b* emits light with low luminance, and the region 221*c* does not emit light. Other regions 222*a* to 226*a*, 222*b* to 226*b*, and 222*c* to 226*c* do not emit light. At the following timings, light emission states of respective regions are individually controllable, based on luminance of the light-emitting diodes 21*a* to 21*c*.

When the backlight section with the configuration illustrated in FIGS. 10A and 10B is prepared, the light emission state is more specifically controllable by control of the scattering state of each region of the PDLC panel 220' and control of the light-emitting diodes 21*a* to 21*c*.

(9. Modifications)

It is to be noted that the configurations and control examples of the backlight section described in the above embodiments are only examples, and the present disclosure is not limited thereto. For example, in FIGS. 1, 3A, and 3B, an example in which a scattering region of the PDLC panel 220 is partitioned into six regions is illustrated; however, the number of partitioned regions and a partitioning direction in the present disclosure are not limited thereto. The positions of the light-emitting diodes 21 as light sources in the present disclosure are not limited to the example illustrated in FIGS. 3A and 3B, and the like.

Moreover, an example in which the backlight section uses light-emitting diodes as light sources is illustrated; however, the backlight section may use any other light source.

Further, in the example illustrated in FIG. 1, a display unit in which the control section 41 controls the scattering state of the PDLC panel 220 and the light emission states of the light-emitting diodes 21 is configured. On the other hand, for example, a program executing a procedure illustrated in the flow chart in FIG. 4 or the flow chart in FIG. 5 may be created and installed in a computer including a PDLC panel to achieve a similar function. As used herein, the term "computer" refers to an information processing apparatus having a function of executing a program, and examples of the computer include various program-installable apparatuses such as smartphones and tablet terminals. Moreover, the program may be stored in any of various kinds of recording media to be installed in the computer.

The present disclosure may have the following configurations.

(1) A display unit including:

an image display panel;

a backlight section disposed on a back surface of the image display panel, and including a light guide member and a polymer dispersed liquid crystal panel;

a light source emitting light, the light being allowed to enter the light guide member of the backlight section;

a polymer dispersed liquid crystal panel drive section driving the polymer dispersed liquid crystal panel of the backlight section in synchronization with writing of an image displayed on the image display panel to control a location that scatters light incident on the light guide member on the polymer dispersed liquid crystal panel; and a light source drive section allowing the light source to blink in synchronization with a period in which light is scattered by the polymer dispersed liquid crystal panel.

(2) The display unit according to (1), in which the polymer dispersed liquid crystal panel is partitioned into a plurality of first regions that are one-dimensionally arrayed in a first direction, the polymer dispersed liquid crystal panel drive section drives the polymer dispersed liquid crystal panel to allow the plurality of first regions to individually scatter light in a first period, and the light source drive section allows the light source to emit light in a second period, the second period being arranged within the first period.

(3) The display unit according to (2), further including:

a touch panel detecting an object in contact with or in proximity to a surface of the image display panel; and a touch operation identification section identifying an operation instruction by the object in contact with or in proximity to the surface of the image display panel, based on a detection state on the touch panel, wherein, based on the operation instruction identified by the touch operation identification section, the polymer dispersed liquid crystal panel drive section drives the plurality of first regions to individually scatter light, and the light source drive section drives the light source to emit light in the second period.

(4) The display unit according to (3), in which the operation instruction identified by the touch operation identification section is an operation instruction involving movement of a part or a whole of an image displayed on the image display panel.

(5) The display unit according to (3) or (4), in which, when the operation instruction is not identified, the light source drive section allows the light source to continuously emit light, and the polymer dispersed liquid crystal panel drive section allows an entire surface of the polymer dispersed liquid crystal panel to scatter light.

(6) The display unit according to any one of (2) to (5), in which, depending on a state or a kind of an image displayed on the image display panel, the polymer dispersed liquid crystal panel drive section drives the plurality of first regions to individually scatter light, and the light source drive section drives the light source to emit light in the second period.

(7) The display unit according to any one of (2) to (6), in which the light source drive section controls brightness of the backlight section by changing duration of the second period in which the light source emits light.

(8) The display unit according to any one of (2) to (7), in which the light guide member of the backlight section is partitioned into a plurality of second regions that are one-dimensionally arrayed in a second direction, the second direction being different from the first direction, the light source is disposed for each of the second regions, and the backlight is partitioned into a plurality of third regions that are two-dimensionally arrayed in the first direction and the second direction, and luminance of the plurality of third regions are individually controllable by both selection of the first region driven by the polymer dispersed liquid crystal panel drive section to scatter light and selection of a light source driven by the light source drive section to be turned on.

(9) A displaying method including:

driving a polymer dispersed liquid crystal panel included in a backlight section in synchronization with writing of an image displayed on an image display panel to control a location that scatters light incident on a light guide member included in the backlight section on the polymer dispersed liquid crystal panel, the backlight section being disposed on a back surface of the image display panel; and allowing a light source to blink in synchronization with a period in which light is scattered by the polymer dispersed liquid crystal panel, the light source allowing light to enter the light guide member.

(10) A recording medium having a computer-readable program embodied therein, the computer readable program causing, when executed by a machine, the machine to implement a method, the method including:

driving a polymer dispersed liquid crystal panel included in a backlight section in synchronization with writing of an image displayed on an image display panel to control a location that scatters light incident on a light guide member included in the backlight section on the polymer dispersed liquid crystal panel, the backlight section being disposed on a back surface of the image display panel; and allowing a light source to blink in synchronization with a period in which light is scattered by the polymer dispersed liquid crystal panel, the light source allowing light to enter the light guide member.

It should be understood by those skilled in the art that various modifications, combinations, sub-combinations, and alterations may occur depending on design requirements and other factors insofar as they are within the scope of the appended claims or the equivalents thereof.

What is claimed is:

1. A display unit comprising:

an image display panel;

a backlight section disposed on a back surface of the image display panel, and including a light guide member and a polymer dispersed liquid crystal panel;

a light source configured to emit light, the light being allowed to enter the light guide member of the backlight section;

a polymer dispersed liquid crystal panel drive section configured to drive the polymer dispersed liquid crystal panel of the backlight section in synchronization with writing of an image displayed on the image display panel to control a location that scatters light incident on the light guide member on the polymer dispersed liquid crystal panel; and a light source drive section configured to cause the light source to blink in synchronization with a period in which light is scattered by the polymer dispersed liquid crystal panel such that the light source is caused to emit light only during the period in which the light is scattered by the polymer dispersed liquid crystal panel.

2. The display unit according to claim 1, wherein the polymer dispersed liquid crystal panel is partitioned into a plurality of first regions that are one-dimensionally arrayed in a first direction, the polymer dispersed liquid crystal panel drive section drives the polymer dispersed liquid crystal panel to allow the plurality of first regions to individually scatter light in a first period, and the light source drive section allows the light source to emit light in a second period, the second period being arranged within the first period.

3. The display unit according to claim 2, further comprising:

a touch panel detecting an object in contact with or in proximity to a surface of the image display panel; and a touch operation identification section identifying an operation instruction by the object in contact with or in proximity to the surface of the image display panel, based on a detection state on the touch panel, wherein, based on the operation instruction identified by the touch operation identification section, the polymer dispersed liquid crystal panel drive section drives the plurality of first regions to individually scatter light, and the light source drive section drives the light source to emit light in the second period.

4. The display unit according to claim 3, wherein the operation instruction identified by the touch operation identification section is an operation instruction involving movement of a part or a whole of an image displayed on the image display panel.

5. The display unit according to claim 4, wherein, when the operation instruction is not identified, the light source drive section allows the light source to continuously emit light, and the polymer dispersed liquid crystal panel drive section allows an entire surface of the polymer dispersed liquid crystal panel to scatter light.

6. The display unit according to claim 2, wherein, depending on a state or a kind of an image displayed on the image display panel, the polymer dispersed liquid crystal panel drive section drives the plurality of first regions to individually scatter light, and the light source drive section drives the light source to emit light in the second period.

7. The display unit according to claim 2, wherein the light source drive section controls brightness of the backlight section by changing duration of the second period in which the light source emits light.

8. The display unit according to claim 2, wherein the light guide member of the backlight section is partitioned into a plurality of second regions that are one-dimensionally arrayed in a second direction, the second direction being different from the first direction, the light source is disposed for each of the second regions, and the backlight is partitioned into a plurality of third regions that are two-dimensionally arrayed in the first direction and the second direction, and luminance of the plurality of third regions are individually controllable by both selection of the first region driven by the polymer dispersed liquid crystal panel drive section to scatter light and selection of a light source driven by the light source drive section to be turned on.

9. A displaying method comprising:

driving a polymer dispersed liquid crystal panel included in a backlight section in synchronization with writing of an image displayed on an image display panel to control a location that scatters light incident on a light guide member included in the backlight section on the polymer dispersed liquid crystal panel, the backlight section being disposed on a back surface of the image display panel; and allowing a light source to blink in synchronization with a period in which light is scattered by the polymer dispersed liquid crystal panel such that the light source is caused to emit light only during the period in which the light is scattered by the polymer dispersed liquid crystal panel, the light source allowing light to enter the light guide member.

10. A non-transitory computer readable medium having a computer-readable program embodied therein, the computer readable program causing, when executed by a machine, the machine to implement a method, the method comprising:

driving a polymer dispersed liquid crystal panel included in a backlight section in synchronization with writing of an image displayed on an image display panel to control a location that scatters light incident on a light guide member included in the backlight section on the polymer dispersed liquid crystal panel, the backlight section being disposed on a back surface of the image display panel; and allowing a light source to blink in synchronization with a period in which light is scattered by the polymer dispersed liquid crystal panel such that the light source is caused to emit light only during the period in which the light is scattered by the polymer dispersed liquid crystal panel, the light source allowing light to enter the light guide member.

* * * * *